United States Patent
Yoshida

(10) Patent No.: US 12,223,162 B2
(45) Date of Patent: Feb. 11, 2025

(54) DISPLAY CONTROL METHOD AND DISPLAY SYSTEM

(71) Applicant: SEIKO EPSON CORPORATION, Tokyo (JP)

(72) Inventor: Masataka Yoshida, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 79 days.

(21) Appl. No.: 17/993,066

(22) Filed: Nov. 23, 2022

(65) Prior Publication Data
US 2023/0161468 A1    May 25, 2023

(30) Foreign Application Priority Data
Nov. 25, 2021 (JP) .................................. 2021-190796

(51) Int. Cl.
*G06F 3/04845* (2022.01)
*H04N 9/31* (2006.01)

(52) U.S. Cl.
CPC .......... *G06F 3/04845* (2013.01); *H04N 9/31* (2013.01)

(58) Field of Classification Search
CPC ... G06F 3/04845; G06F 3/04847; H04N 9/31; H04N 9/317; H04N 9/3185; H04N 9/3147; G03B 21/142
See application file for complete search history.

(56) References Cited

U.S. PATENT DOCUMENTS 8,044,966 B1 * 10/2011 Diamond ................. H04N 9/31
345/697
2010/0185970 A1 * 7/2010 Benenson ............. G06F 3/0482
715/810

(Continued)

FOREIGN PATENT DOCUMENTS

JP    2007-047440 A    4/2007
JP    2010-078974 A    4/2010

(Continued)

OTHER PUBLICATIONS

Epson Projector Professional Tool Operation Guide; dated Jun. 21, 2021—63 pages.

(Continued)

*Primary Examiner* — Phi Hoang
(74) *Attorney, Agent, or Firm* — Dority & Manning, P.A.

(57) ABSTRACT

A display control method includes displaying, by a projection device, a first user interface related to an adjustment of a projection image, displaying, by a control device communicating with the projection device, a second user interface including a display object corresponding to the projection image, transmitting, by the projection device, first adjustment information based on a first operation to the first user interface to the control device when the projection device accepts the first operation, adjusting, by the projection device, the projection image based on the first adjustment information, updating, by the control device, the display object based on the first adjustment information, transmitting, by the control device, second adjustment information based on a second operation to the second user interface to the projection device when the control device accepts the second operation, adjusting, by the projection device, the projection image based on the second adjustment informa- (Continued)

tion, and updating, by the projection device, the first user interface based on the second adjustment information.

8 Claims, 11 Drawing Sheets

(56) References Cited

U.S. PATENT DOCUMENTS

| | | | |
|---|---|---|---|
| 2011/0157563 A1* | 6/2011 | Funada | G03B 21/147 |
| | | | 353/70 |
| 2013/0321782 A1 | 12/2013 | Ishii | |
| 2018/0061370 A1 | 8/2018 | Ota et al. | |
| 2020/0107000 A1* | 4/2020 | Ishii | G09G 3/36 |
| 2020/0252590 A1* | 8/2020 | Surati | H04N 9/3194 |

FOREIGN PATENT DOCUMENTS

| | | |
|---|---|---|
| JP | 2011-215530 A | 10/2011 |
| JP | 2013-254028 A | 12/2013 |
| JP | 2013-254029 A | 12/2013 |
| JP | 2018-037834 A | 3/2018 |

OTHER PUBLICATIONS

Epson User's Guide Multimedia Projector EB-L30002U EB-L30000U, dated 2020—283 pages.

* cited by examiner

FIG. 8
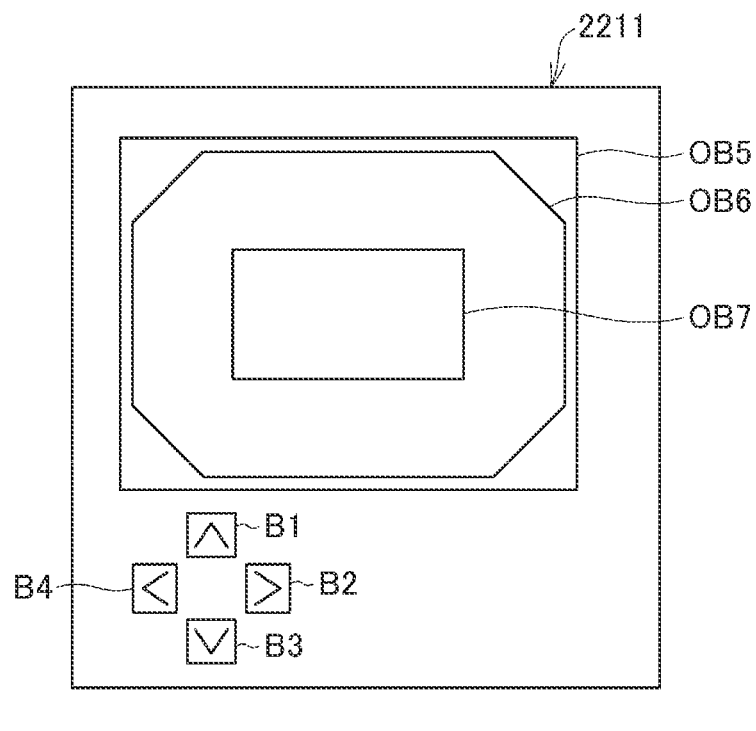
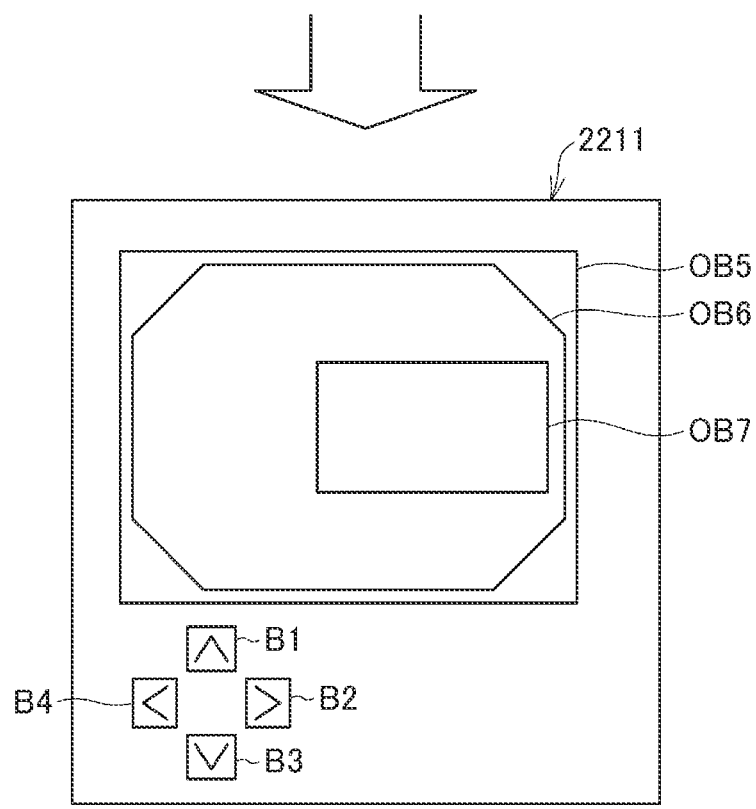

DISPLAY CONTROL METHOD AND DISPLAY SYSTEM

The present application is based on, and claims priority from JP Application Serial Number 2021-190796, filed Nov. 25, 2021, the disclosure of which is hereby incorporated by reference herein in its entirety.

BACKGROUND

1. Technical Field

The present disclosure relates to a display control method and a display system.

2. Related Art

In the past, there has been known a system which has a projection device, and a control device communicating with the projection device, and is which communication is transmitted and received between the projection device and the control device. JP-A-2011-215530 discloses that arbitrary one of a plurality of computers transmits operation information for operating a projection screen to be projected from a projector to the projector. JP-A-2011-215530 also discloses that the projector performs screen control of the projection screen in accordance with the operation information received, and transmits control information representing a control result of the screen control to the plurality of computers.

As such a system as described in JP-A-2011-215530, there is cited a system in which the control device displays an adjusting screen in an adjustment of a projection image. In the system of this kind, there has been required an operation that a user performs an adjustment operation on the adjusting screen, and then confirms an adjustment result of the adjustment operation with the projection image. Therefore, in the system of this kind, transfer of gaze of the user occurs frequently in some cases, and there is a problem that a burden on the user is heavy in the adjustment of the projection image.

SUMMARY

An aspect of the present disclosure is directed to a method of controlling a display system including displaying, by a projection device, a first user interface related to an adjustment of a projection image, displaying, by a control device communicating with the projection device, a second user interface as a user interface which is related to the adjustment of the projection image, and which includes a display object corresponding to the projection image, transmitting, by the projection device, first adjustment information based on a first operation to the first user interface to the control device when the projection device accepts the first operation, adjusting, by the projection device, the projection image based on the first adjustment information, updating, by the control device, the display object based on the first adjustment information, transmitting, by the control device, second adjustment information based on a second operation to the second user interface to the projection device when the control device accepts the second operation, adjusting, by the projection device, the projection image based on the second adjustment information, and updating, by the projection device, the first user interface based on the second adjustment information.

Another aspect of the present disclosure is directed to a display system including a projection device, and a control device configured to communicate with the projection device, wherein the projection device displays a first user interface related to an adjustment of a projection image, the control device displays a second user interface as a user interface which is related to the adjustment of the projection image, and which includes a display object corresponding to the projection image, the projection device transmits first adjustment information based on a first operation to the first user interface to the control device when the projection device accepts the first operation, the projection device adjusts the projection image based on the first adjustment information, the control device updates the display object based on the first adjustment information, the control device transmits second adjustment information based on a second operation to the second user interface to the projection device when the control device accepts the second operation, the projection device adjusts the projection image based on the second adjustment information, and the projection device updates the first user interface based on the second adjustment information.

BRIEF DESCRIPTION OF THE DRAWINGS

FIG. 8 is a diagram showing an example of the second UI.

DESCRIPTION OF AN EXEMPLARY EMBODIMENT

An embodiment will hereinafter be described with reference to the drawings.

Figure 1:
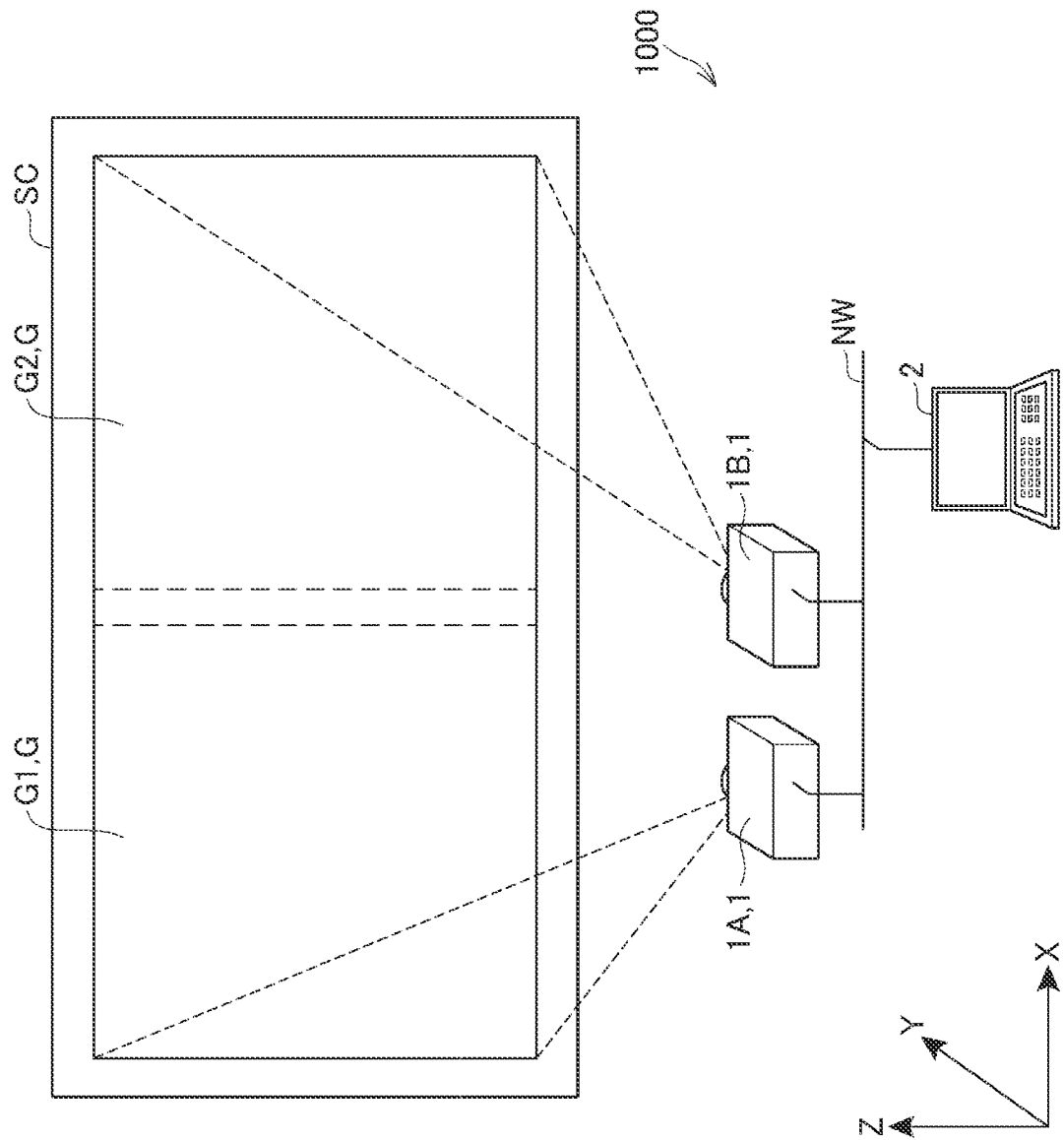
FIG. 1 is a diagram showing an example of configuration of a display system.
Figure 3:
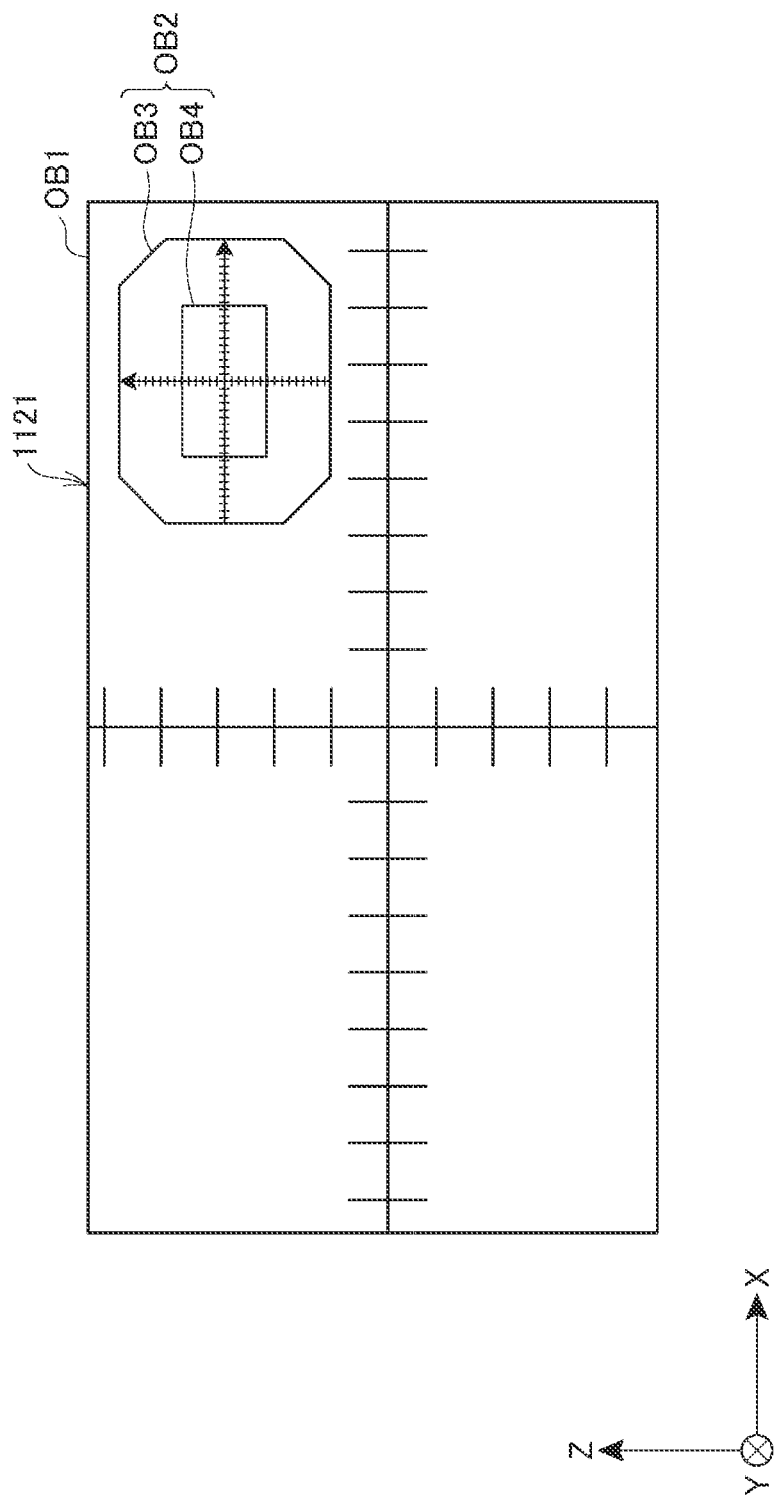
FIG. 3 is a diagram showing an example of a first UI.
Figure 7:
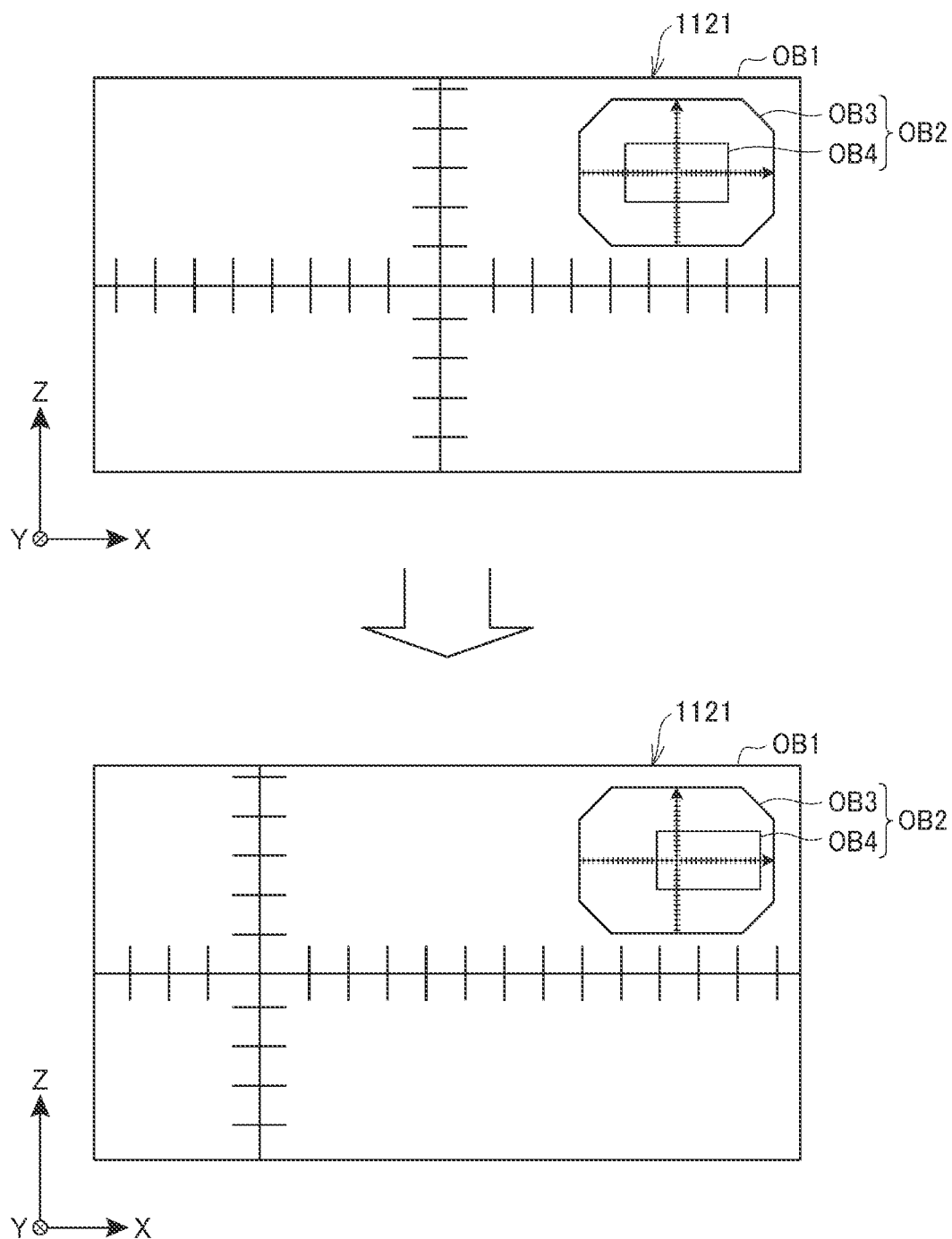
FIG. 7 is a diagram showing an example of the first UI.
Figure 10:
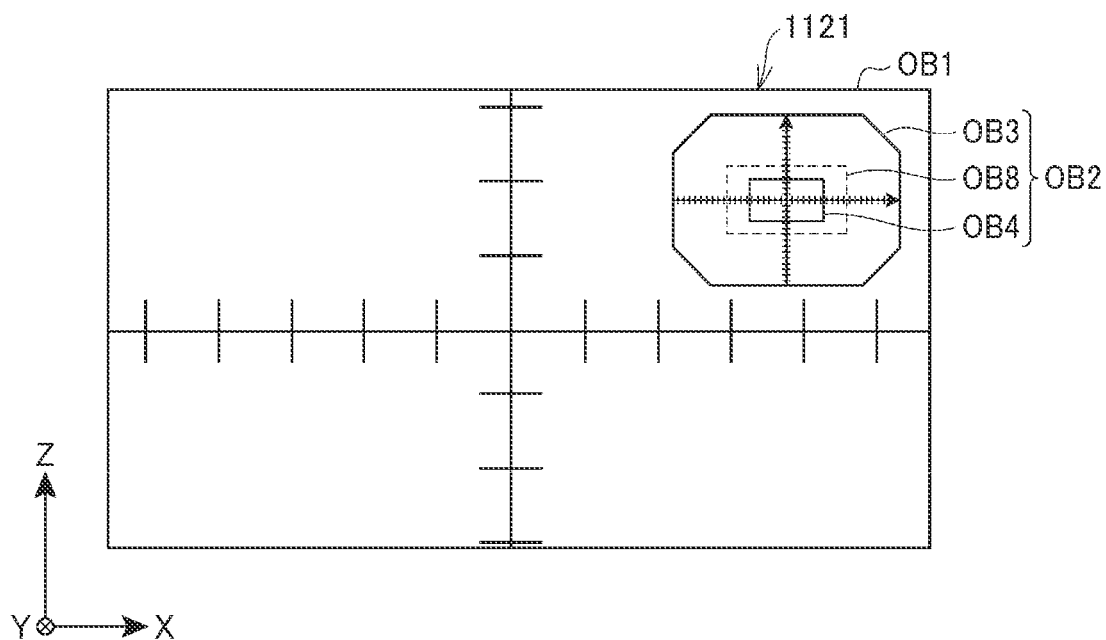
FIG. 10 is a diagram showing an example of the first UI.

FIG. 1 is a diagram showing an example of a configuration of a display system 1000. In FIG. 1, there are illustrated an X axis, a Y axis, and a Z axis. The A axis, the Y axis, and the Z axis are perpendicular to each other. The Z axis represents an up-and-down direction and a vertical direction. The X axis and the Y axis are parallel to a horizontal direction. The X axis represents a right-and-left direction. The Y axis represents a front-back direction. A positive direction of the Z axis represents an upward direction. A positive direction of the X axis represents a rightward direction. A positive direction of the Y axis represents a frontward direction. The X axis, the Y axis, and the Z axis shown in FIG. 3, FIG. 7, and FIG. 10 are the same as the X axis, the Y-axis, and the Z axis shown in FIG. 1.

FIG. 1 is a diagram showing a configuration of the display system 1000. The display system 1000 according to the present embodiment is provided with a plurality of projectors 1 arranged side by side. The display system 1000 performs tiling display of displaying a plurality of projection images G so as to be arranged side by side with the plurality of projectors 1.

As shown in FIG. 1, the display system 100 according to the present embodiment is provided with two projectors 1 consisting of projectors 1A, 1B. The two projectors 1 is arranged in a 1×2 matrix. The projector 1 is an example of a "projection device."

The number of the projectors 1 provided to the display system 1000 is not limited to two, and can be one, or can also be three or more. It is sufficient for an installation on of the plurality of projectors 1 to be a configuration of being arranged in an N×M matrix. Here, N and M are each an integer equal to or greater than 1.

The projectors 1 project image light based on image data input from a control device 2 or an image supply device separated from the control device 2 to thereby display a projection image G on a screen SC as a projection surface. The screen SC can be a curtain-like screen, or it is also possible to use a wall surface of a building, or a plane of an installed object as the screen SC. The screen SC is not limited to a plane, and can also be a curved surface or a surface having asperity.

A display configuration of the projection image G shown in FIG. 1 represents a display configuration after an adjustment of the projection image G has appropriately been executed. In FIG. 1, the projector 1A displays a projection image G1 superimposed on an edge of a projection image G2 on the screen SC. In FIG. 1, the projector 1B displays the projection image G2 superimposed on an edge of the projection image G1 on the screen SC.

The projectors 1A, 1B are each connected to a network NW. The network NW is a network constituted by communication equipment such as a public network, a dedicated line, or other communication lines, and a specific configuration thereof is not limited. For example, the network NW can be a wide area network, or can also be a local network. The network NW can include at least either one of a wireless communication circuit and a wired communication circuit.

As shown in FIG. 1, the display system 1000 is provided with the control device 2. The control device 2 is connected to the network NW. The control device 2 shown in FIG. 1 is a laptop PC (Personal Computer). The control device 2 is not limited to the laptop PC, and can be equipment such as a desktop PC, a tablet terminal, or a smartphone. The control device 2 controls the projectors 1. When the control device 2 functions as the image supply device, the control device 2 divides one frame of the image data into two, and outputs respective parts of the image data thus divided to the projectors 1A, 1B, respectively.

Figure 2:
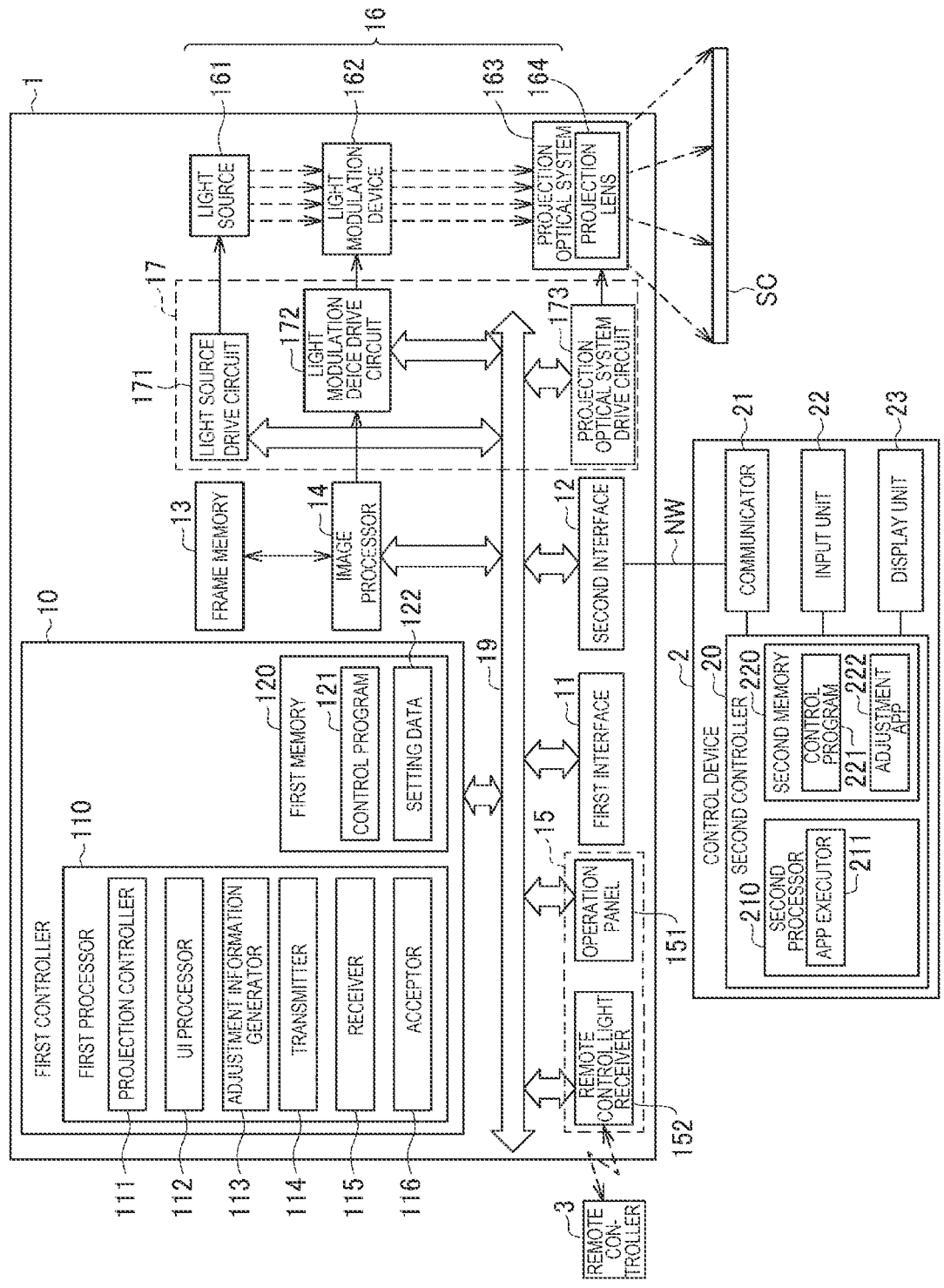
FIG. 2 is a diagram showing an example of a configuration of a projector and a control device.

FIG. 2 is a block diagram showing a configuration of the projectors 1 and the control device 2.

The projectors 1 are each provided with a first controller 10. The first controller 10 is provided with a first processor 110 for executing a program, such as a CPU (Central Processing Unit) or an MPU (Micro Processing Unit), and a first memory 120, and controls each part of the projector 1. In the first controller 10, the first processor 110 retrieves a control program 121 stored in the first memory 120 to execute processing. The first processor 110 retrieves and then executes the control program 121 to thereby function as a projection controller 111, a UI (User Interface) processor 112, an adjustment information generator 113, a transmitter 114, a receiver 115, and an acceptor 116.

The first memory 120 is a memory, and stores a program to be executed by the first processor 110, data to be processed by the first processor 110, and so on. The first memory 120 has a nonvolatile storage area for storing the program and the data in a nonvolatile manner. It is possible for the first memory 120 to be provided with a volatile storage area to form a work area for temporarily storing the program to be executed by the first processor 110 and the data as the processing target.

The first memory 120 stores setting data 122 besides the control program 121 to be executed by the first processor 110. The setting data 122 includes setting values related to an operation of the projector 1. As the setting values included in the setting data 122, there are cited, for example, a setting value representing a processing content to be executed by an image processor 14, a parameter to be used in processing of the image processor 14, a parameter representing a lens position of a projection lens 164, and a parameter representing a zoom magnification.

In the following description, the parameter representing the lens position of the projection lens 164 is referred to as a "lens position parameter." In the following description, the parameter representing the zoom magnification is referred to as a "zoom magnification parameter."

The projector 1 is provided with a first interface 11, a second interface 12, a frame memory 13, the image processor 14, and an operator 15. These constituents are coupled to the first controller 10 via a bus 19 so as to be able to perform data communication.

The first interface 11 provided with communication hardware such as a connector and an interface circuit compliant with a predetermined communication standard. The first interface 11 transmits and receives the image data, control data, and so on to and from equipment coupled to the projector 1 in accordance with the control by the first controller and the predetermined communication standard. The first interface 11 can include an interface capable of transmitting a video and an audio in digital fashion such as HDMI (High-Definition Multimedia Interface), DisplayPort, HDBaseT, USB Type-C, or 3G-SDI (Serial Digital Interface), HDMI is a registered trademark. HDBaseT is a registered trademark. The first interface 11 can include an interface for data communication such as USB. It is possible for the first interface 11 to include an interface which is provided with an analog video terminal such as an RCA terminal, a VGA terminal, an S terminal, or a D terminal, and which is capable of transmitting and receiving an analog video signal.

The second interface 12 is provided with communication hardware such as a connector to be connected to the network NW and an interface circuit. The second interface 12 communicates with the control device 2 connected via the network NW in accordance with the predetermined communication standard.

The frame memory 13 and the image processor 14 are formed of, for example, an integrated circuit. The integrated circuit includes an LSI, an ASIC (Application Specific Integrated Circuit), a PLD (Programmable Logic Device), an FPGA (Field-Programmable Gate Array), an SoC (System-on-a-Chip), and so on. It is possible for an analog circuit to be included in a part of the configuration of the integrated circuit, or it is also possible to adopt a configuration having the first controller 10 and the integrated circuit combined with each other.

The frame memory 13 is provided with a plurality of banks. Each of the banks has a storage capacity sufficient for writing one frame. The frame memory 13 is formed of, for example, an SDRAM (Synchronous Dynamic Random Access Memory).

The image processor 14 executes image processing such as a resolution conversion process, a resizing process, a correction of a distortion aberration, a shape correction process, a digital zoom process, and an adjustment of the tint and luminance of the image on the image data developed in the frame memory 13. The image processor 14 executes the processing designated by the first controller 10, and executes the processing using a parameter input from the first controller 10 as needed. It is possible for the image processor 14 to execute two or more of the processes described above in combination with each other. The image processor 14 reads out the image data on which the processing has been executed from the frame memory 13, and then outputs the image data to a light modulation device drive circuit 172.

The operator 15 is provided with an operation panel 151, and a remote control light receiver 152.

The operation panel 151 is disposed in, for example, a chassis of the projector 1, and is provided with a variety of switches such as a power switch for switching ON and OFF the power of the projector 1. When the switch is operated, the operation panel 151 outputs a signal corresponding to the switch having been operated to the first controller 10.

The remote control light receiver 152 is provided with a light receiving sensor for receiving an infrared signal transmitted by a remote controller 3, a circuit for decoding the infrared signal received by the light receiving sensor, and so on. The remote control light receiver 152 outputs a signal corresponding to the infrared signal received by the light receiving sensor to the first controller 10. The signal which is output to the first controller 10 by the remote control light receiver 152 is a signal corresponding to the switch of the remote controller 3 thus operated.

The projector 1 is provided with a projection unit 16, and a driver 17 for driving the projection unit 16. The projection unit 16 is provided with a light source 161, a light modulation device 162, and a projection optical system 163. The driver 17 is provided with a light source drive circuit 171, the light modulation device drive circuit 172, and a projection optical system drive circuit 173.

The light source drive circuit 171 is coupled to the first controller 10 via the bus 19, and is further coupled to the light source 161. The light source drive circuit 171 puts the light source 161 on or out in accordance with the control by the first controller 10.

The light modulation device drive circuit 172 is coupled to the first controller 10 via the bus 19, and further the light modulation device 162 is coupled to the light modulation device drive circuit 172. The light modulation device drive circuit 172 drives the light modulation device 162 in accordance with the control by the first controller 10 to draw an image frame by frame on a light modulation element provided to the light modulation device 162. To the light modulation device drive circuit 172, there is input the image data corresponding to the respective primary colors of R, G, and B from the image processor 14. The character R represents red, the character G represents green, and the character B represents blue. The light modulation device drive circuit 172 converts the image data input thereto into data signals suitable for the operations of liquid crystal panels as the light modulation elements provided to the light modulation device 162. The light modulation device drive circuit 172 applies a voltage to each pixel of each of the liquid crystal panels based on the data signal thus converted, and draws an image on each of the liquid crystal panels.

The light source 161 is constituted by a lamp such as a halogen lamp, a xenon lamp, or a super-high pressure mercury lamp, or a solid-state light source such as an LED or a laser light source. The source 161 is put on by the electrical power supplied from the light source drive circuit 171, and emits light toward the light modulation device 162.

The light modulation device 162 is provided with, for example, three liquid crystal panels corresponding respectively to the three primary colors of RGB. The light emitted from the light source 161 is separated into colored light beams of three colors of B, G, and B, and the colored light beams respectively enter the corresponding liquid crystal panels. The three liquid crystal panels are each a transmissive liquid crystal panel, and each modulate the light beam transmitted through the liquid crystal panel to generate an image light beam. The image light beams, which have been modulated while passing through the respective liquid crystal panels, are combined by a combining optical system such as a cross dichroic prism, and are then emitted to the projection optical system 163.

Although in the present embodiment, there is illustrated when the light modulation device 162 is provided with the transmissive liquid crystal panels as the light modulation elements, the light modulation elements can be reflective liquid crystal panels, or can also be digital mirror devices (digital micromirror devices).

The projection optical system 163 is provided with the projection lens 164 for focusing the image light beam having been modulated by the light modulation device 162 on the screen SC. The projection lens 164 in the present embodiment is a zoom lens for projecting the image light beam modulated by the light modulation device 162 at a desired magnification ratio. The projection optical system 163 can also be provided with a zoom mechanism for magnifying or demagnifying the projection image G to be projected on the screen SC, a focus adjustment mechanism for performing an adjustment of the focus, and so on.

To the projection optical system 163, there is coupled the projection optical system drive circuit 173. The projection optical system drive circuit 173 is coupled to the bus 19. The projection optical system drive circuit 173 performs a lens shift adjustment of moving the projection lens 164 in a plane perpendicular to an optical axis of the projection lens 161 to move the projection image G to be projected on the screen SC in the X-axis direction and the Z-axis direction in accordance with the control by the first controller 10.

As described above, the first processor 110 functions as the projection controller 111, the UI processor 112, the adjustment information generator 113, the transmitter 114, the receiver 115, and the acceptor 116.

The projection controller 111 controls the image processor 14, the driver 17, and so on to display the projection image G on the screen SC.

Specifically, the projection controller 111 controls the image processor 14 to make the image processor 14 process the image data developed in the frame memory 13. On this occasion, the projection controller 111 retrieves the parameter which is necessary for the image processor 14 to perform the processing from the first memory 120, and then outputs the parameter to the image processor 14.

The projection controller 111 controls the light source drive circuit 171 and the light modulation device drive circuit 172 to make the light source drive circuit 171 out the light source 161 on, make the light modulation device drive circuit 172 drive the light modulation device 162, and make the projection unit 16 project the projection image G. The projection controller 111 controls the projection optical system 163 to start up a motor to adjust the zoom and the focus of the projection optical system 163. The projection controller 111 retrieves the lens position parameter from the setting data 122, and controls the projection optical system drive circuit 173 based on the lens position parameter thus retrieved to thereby move the projection lens 164 to the lens position represented by the lens position parameter. The lens position parameter includes a parameter representing a lens position of the projection lens 164 in the up-and-down direction, and a parameter representing a lens position of the projection lens 164 in the horizontal direction.

The UI processor 112 generates the image data of a first UI 1121. The first UI 1121 is a UI related to the adjustment of the projection image G. When the UI processor 112 generates the image data of the first UI 1121, the UI processor 112 develops the image data of the first UI 1121 thus generated in the frame memory 13. It is possible for the UI processor 112 to superimpose the image data of the first UI 1121 on the image data having already been developed in the frame memory 13, or to overwrite the image data having already been developed in the frame memory 13 with the image data of the first UI 1121. The UI processor 112 updates the display content of the first UI 1121.

FIG. 3 is a diagram showing an example of the first UI 1121 to be projected on the screen SC.

The first UI 1121 shown in FIG. 3 is the first UI 1121 for a lens shift adjustment. The first UI 1121 for the lens shift adjustment has a first display object OB1, and a second display object OB2 to be superimposed on the first display object OB1.

The second display object OB2 is an image representing a positional relationship between a lens shift available area and the projection image G. The lens shift available area means an area in which it is possible to move the projection image G by the lens shift adjustment. The second display object OB2 includes a third display object OB3, and a fourth display object OB4 to be superimposed on the third display object OB3. The third display object OB3 is an image representing the lens shift available area. In the lens shift available area represented by the third display object OB3, there are disposed a scale extending upward and downward, and a scale extending rightward and leftward. The fourth display object OB4 is an image representing a size of the projection image G, and a position of the projection image G in the lens shift available area.

The first display object OB1 is an image obtained by magnifying the fourth display object OB4 in the state of being superimposed on the third display object OB3. The size of the first display object OB1 to be projected on the screen SC coincides with the size of a projection area where the projection image G is projected.

When the projector 1 starts the display of the first UI 1121, the UI processor obtains the lens position parameter and the zoom magnification parameter from the setting data 122. Subsequently, the UI processor 112 recognizes the size of the projection image G to the lens shift available area and the position of the projection image G in the lens shift available area based on these parameters thus obtained, and then generates the second display object OB2 based on the recognition result. The UI processor 112 generates the second display object OB2, and then, generates the first display object OB1 obtained by magnifying the fourth display object OB4 represented by the second display object OB2 thus generated. The UI processor 112 generates the first display object OB1 and the second display, object OB2, and then, generates the first UI 1121 in which the second display object OB2 is superimposed on an upper left portion of the first display object OB1. Then, the UI processor 112 develops the image data of the first UI 1121 thus generated in the frame memory 13.

Going back to the description of the functional units of the first processor 110, the adjustment information generator 113 generates first adjustment information. The adjustment information generator 113 outputs the first adjustment information thus generated to the transmitter 114. The first adjustment information is information representing the adjustment of the projection image G by a first operation accepted by the acceptor 116. The first operation is an operation to the first UI 1121, and is an operation of adjusting the projection image G. The first adjustment information includes information representing a direction in which the projection image G has moved, and information representing a displacement of the projection image G when, for example, the adjustment of the projection image G is the lens shift adjustment. The first adjustment information is information representing a zoom magnification having been adjusted when, for example, the adjustment of the projection image G is the adjustment of the zoom magnification.

The transmitter 114 transmits the first adjustment information to the control device 2 via the second interface 12. An address of the control device 2 is stored in the first memory 120 in advance.

The receiver 115 receives second adjustment information from the control device 2 via the second interface 12. The second adjustment information will be described later.

The acceptor 116 accepts an operation of the user to the projector 1. The acceptor 116 accepts an operation to a variety of switches provided to the chassis of the projector 1 via the operation panel 151. The acceptor 116 accepts an operation to a variety of switches provided to the remote controller 3 via the remote control light receiver 152. The acceptor 116 in the present embodiment accepts the first operation via the operation panel 151 or the remote control light receiver 152.

Then, a configuration of the control device 2 will be described. The control device 2 is provided with a second controller 20, a communicator 21, an input unit 22, and a display unit 23.

The second controller 20 is provided with a second processor 210 for executing a program, such as a CPU or an MPU, and a second memory 220. In the second controller 20, the second processor 210 retrieves and then executes a control program 221 stored in the second memory 220 to thereby control the constituents of the control device 2. The second processor 210 retrieves and then executes an adjustment app 222 stored by the second memory 220 to thereby function as an app executor 211.

The second memory 220 stores a program to be executed by the second processor 210, and data to be processed by the second processor 210. The second memory 220 stores the control program 221 and the adjustment app 222 to be executed by the second processor 210, and other variety of types of data. The second memory 220 has a nonvolatile storage area. The second memory 220 can be provided with a volatile storage area to configure a work area for the second processor 210.

The adjustment app 222 is an application program related to the adjustment of the projection image G.

The communicator 21 is a communication interface provided with a communication circuit, a connector, and so on, and communicates with the projector 1 connected to the network NW in accordance with a predetermined communication standard. The communication standard of the communicator 21 can be a wireless communication standard, or can also be a wired communication standard.

The input unit 22 has an input device such as an operation switch provided to the control device 2, a panel having a touch input function, a mouse, or a keyboard, detects an operation by the user to the input device, and then outputs the detection result to the second controller 20. The second controller 20 executes processing corresponding to the operation to the input device based on the input from the input unit 22.

The display unit 23 is provided with a display, and displays information on the display in accordance with the control by the second controller 20.

As described above, the second processor 210 functions as the app executer 211. The app executer 211 communicates with the projector 1 via the communicator 21. The app executer 211 displays a second UI 2211. The app executer 211 updates the display content of the second UI 2211.

Figure 4:
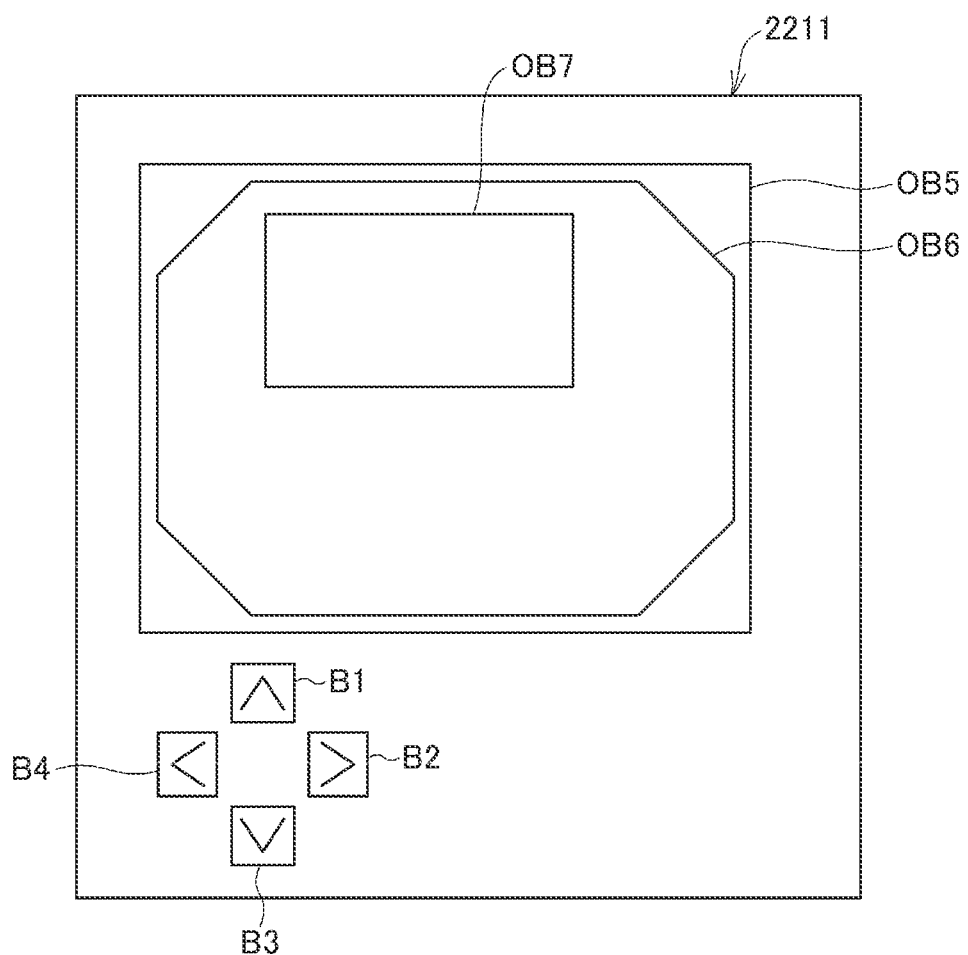
FIG. 4 is a diagram showing as example of a second UI.

FIG. 4 is a diagram showing an example of the second UI 2211. The second UI 2211 shown in FIG. 4 is the second UI 2211 for the lens shift adjustment. The second UI 2211 for the lens shift adjustment has a fifth display object OB5. The fifth display object OB5 is an example of a "display object."

The fifth display object OB5 is an image representing a positional relationship between the lens shift available area and the projection image G. The fifth display object OB5 includes a sixth display object OB6, and a seventh display object OB7 to be superimposed on the sixth display object OB6. The sixth display object OB6 is an image representing the lens shift available area. In the lens shift available area represented by the sixth display object OB6, there can be set the scales similarly to the third display object OB3. The seventh display object OB7 is an image representing the size of the projection image G, and the position of the projection image G in the lens shift available area.

When the app executer 211 starts the display of the second UI 2211, the app executer 211 obtains the lens position parameter and the zoom magnification parameter from the projector 1. Subsequently, the app executer 211 recognizes the size of the projection image G and the position of the projection image G in the lens shift available area based on these parameters thus obtained, and then generates the fifth display object OB5 based on the recognition result.

The second UI 2211 has buttons B1, B2, B3, and B4. The buttons B1, B2, B3, and B4 are software buttons. The button B1 is a button for moving the projection image G upward. The button B2 is a button for moving the projection image G rightward. The button B3 is a button for moving the projection image G downward. The button B4 is a button for moving the projection image G leftward.

The app executer 211 generates the second adjustment information, and then transmits the second adjustment information thus generated to the projector 1. The second adjustment information is information representing the adjustment of the projection image G by a second operation accepted by the app executer 211. The second operation is an operation to the second UI 2211, and is an operation of adjusting the projection image G. The app executer 211 accepts the second operation via at least one of the buttons B1, B2, B3, and B4. The second adjustment information includes information representing a direction in which the projection image G is moved, and information representing a displacement of the projection image G when, for example, the adjustment of the projection image G is the lens shift adjustment. The second adjustment information is information representing a zoom magnification to be adjusted when, for example, the adjustment of the projection image G is the adjustment of the zoom magnification.

Figure 5:
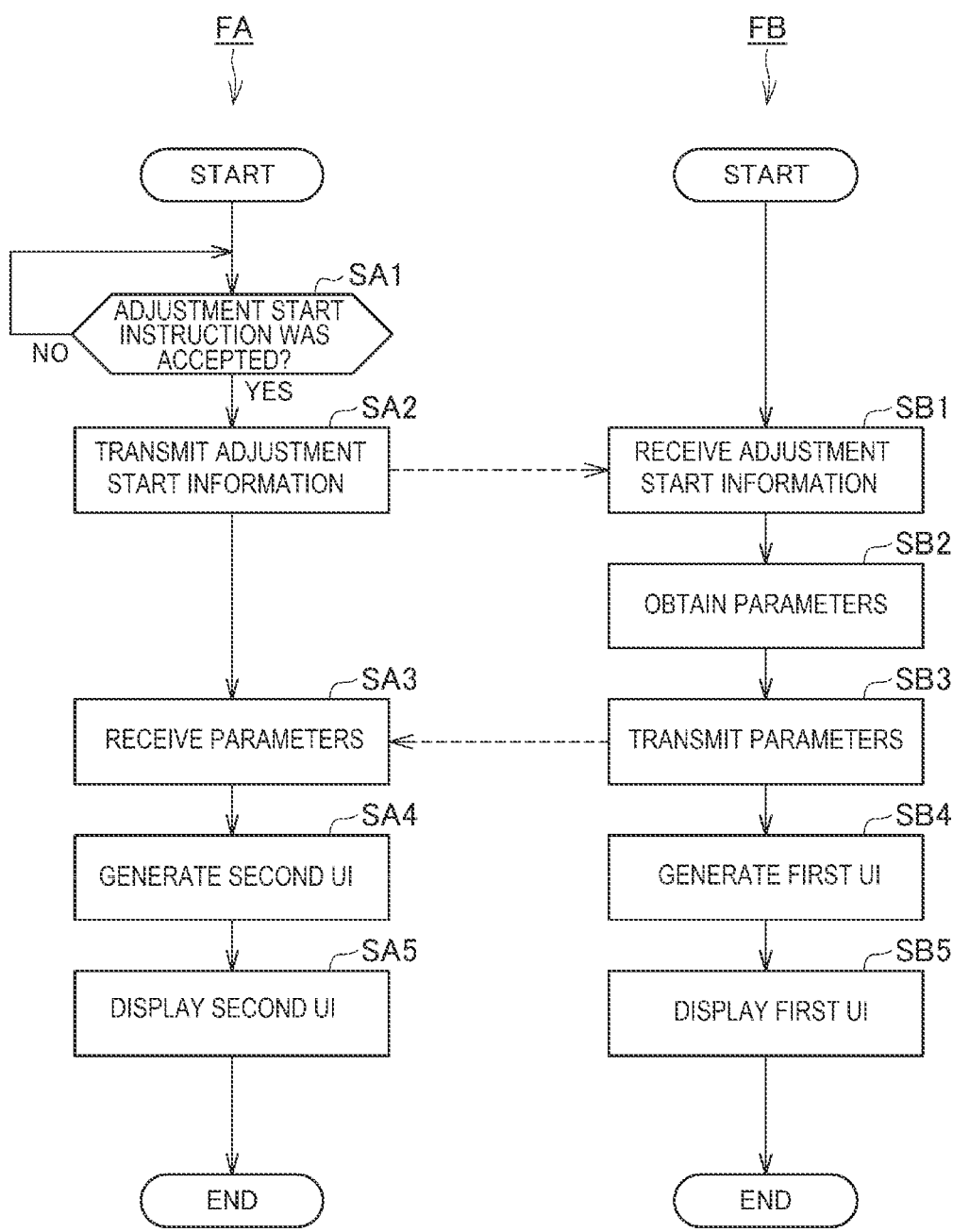
FIG. 5 is a flowchart showing an operation of the display system.

Then, an operation of the display system 1000 will be described. FIG. 5 is a flowchart showing the operation of the display system 1000. In FIG. 5, a flowchart FA represents the operation of the control device 2, and a flowchart FB represents the operation of the projector 1.

In the operations shown in FIG. 5, the lens shift adjustment is illustrated as the adjustment of the projection image G.

As shown in the flowchart FA, the app executer 211 determines (step SA1) whether or not an adjustment start instruction of the lens shift adjustment has been accepted from the user.

When the app executer 211 has determined that the adjustment start instruction of the lens shift adjustment has not been accepted from the user (NO in the step SA1), the app executer 211 perform the determination in the step SA1 once again.

In contrast, when the app executer 211 has determined that the adjustment start instruction of the lens shift adjustment has been accepted from the user (YES in the step SA1), the app executer 211 transmits (step SA2) adjustment start information representing that the adjustment start instruction of the lens shift adjustment has occurred to the projector 1 as the adjustment target.

As shown in the flowchart FB, the receiver 115 receives (step SB1) the adjustment start information.

Then, the transmitter 114 obtains (step SB2) the lens position parameter and the zoom magnification parameter from the setting data 122.

Then, the transmitter 114 transmits (step SB3) the two types of parameters obtained in the step SB2 to the control device 2.

Then, the UI processor 112 generates (step SB4) the first UI 1121.

Then, the projection controller 111 displays (step SB5) the first UI 1121 generated in the step SB4 on the screen SC.

As shown in the flowchart FA, the app executer 211 receives (step SA3) the two types of parameters from the projector 1.

Then, the app executer 211 generates (step SA4) the second UI 2211.

Then, the app executer 211 displays (step SA5) the second UI 2211 generated in the step SA4 on the screen SC.

Then, an operation of the display system 1000 when the adjustment of the projection image G is performed using the first UI 1121 will be described.

Figure 6:
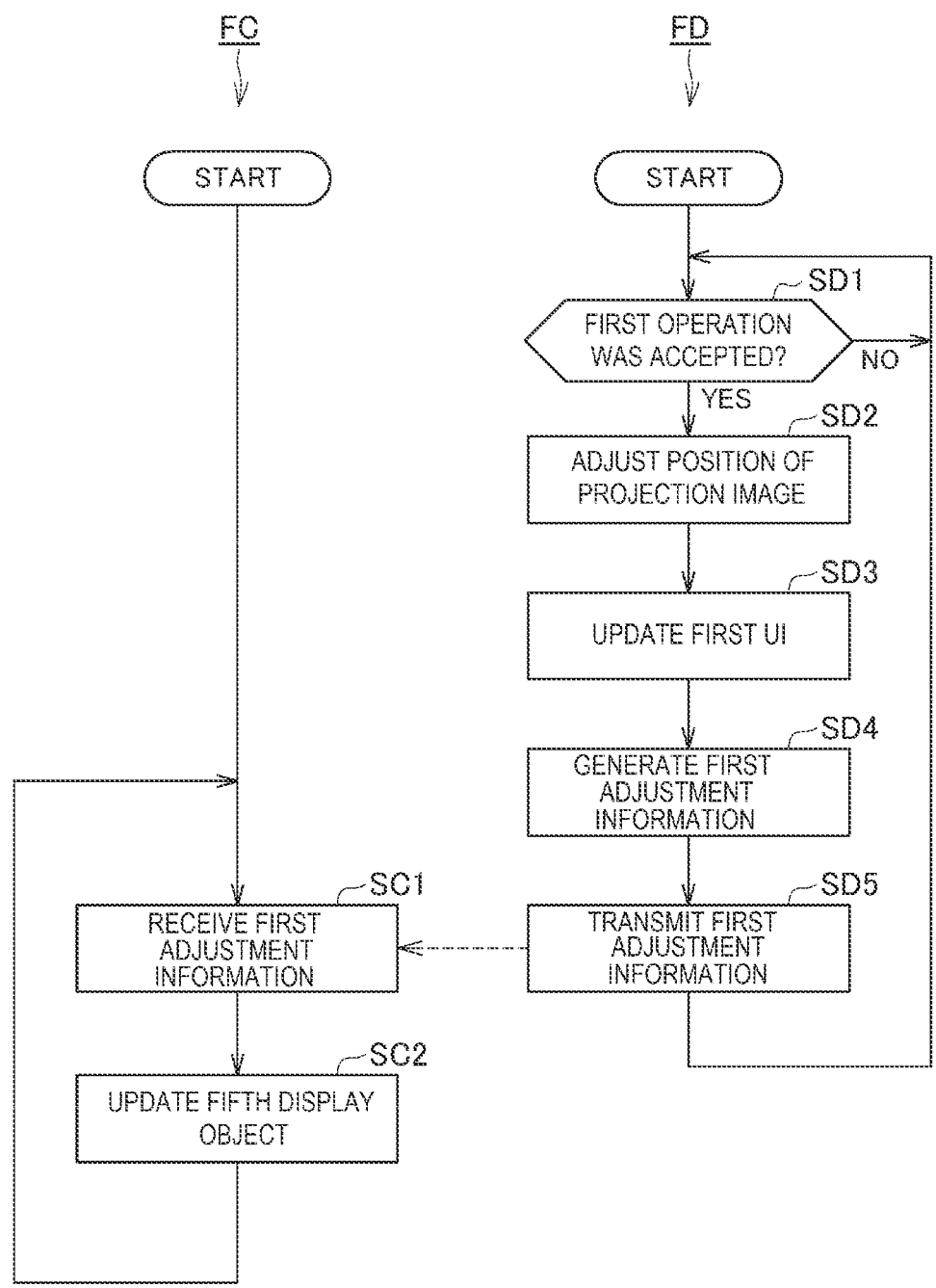
FIG. 6 is a flowchart showing the operation of the display system.

FIG. 6 is a flowchart showing the operation of the display system 1000. In FIG. 6, a flowchart FC represents the operation of the control device 2, and a flowchart FD represents the operation of the projector In the operations shown in FIG. 6, the projector 1 currently displays the first UI 1121, and the control device 2 currently displays the second UI 2211. In the operations shown in FIG. 6, the lens shift adjustment is illustrated as the adjustment of the projection image G.

As shown in the flowchart FD, the acceptor 116 determines (step SD1) whether or not the first operation has been received. In the operations shown in FIG. 6, the first operation is an operation to the first UI 1121 for the lens shift adjustment, and is an operation of moving the projection image G.

When the acceptor 116 has determined that the first operation has not been accepted (NO in the step SD1), the acceptor 116 performs the determination in the step SD1 once again.

When the acceptor 116 has determined that the first operation has been accepted (YES in the step SD1), the projection controller 111 controls the projection optical system drive, circuit 173 to thereby adjust (step SD2) the position of the projection image G in accordance with the first operation thus accepted.

Then, the UI processor 112 updates (step SD3) the first UI 1121 currently displayed by the projector 1 with the first UI 1121 corresponding to the adjustment performed in the step SD2.

FIG. 7 is a diagram showing an example of the first UI 1121 to be projected on the screen SC. FIG. 7 shows when the first operation is an operation of moving the projection image G rightward as much as a first distance. In the case of FIG. 7, the UI processor 112 updates the second display object OB2 currently displayed with the second display object OB2 described below. That is, the UI processor 112 performs the update with the second display object OB2 obtained by moving the fourth display object OB4 rightward as much as a distance corresponding to the first distance in the lens shift available area represented by the third display object OB3. In the case of FIG. 7, the UI processor 112 updates the first display object OB1 currently displayed with the first display object OB1 obtained by magnifying the fourth display object OB4 having been moved rightward.

Then, the adjustment information generator 113 generates (step SD4) the first adjustment information. In the case of FIG. 7, the adjustment information generator 113 generates the first adjustment information representing that the moving direction of the projection image G is the rightward direction, and that the displacement of the projection image G is the first distance.

Then, the transmitter 114 transmits (step SD5) the first adjustment information generated in the step SD4 to the control device 2.

As shown in the flowchart FC, the app executer 211 receives (step SC1) the first adjustment information from the projector 1.

Then, the app executer 211 updates (step SC2) the fifth display object OB5 of the second UI 2211 based on the first adjustment information received in the step SC1.

FIG. 8 is a diagram showing an example of the second UI 2211.

In FIG. 8, there is illustrated when the first adjustment information thus received represents that the moving direction of the projection image G is the rightward direction, and that the displacement of the projection image G is the first distance. As shown in FIG. 8, in the step SC2, the app executer 211 updates the fifth display object OB5 currently displayed with the fifth display object OB5 described below. That is, the app executer 211 performs the update with the fifth display object OB5 obtained by moving the seventh display object OB7 rightward as much as a distance corresponding to the first distance in the lens shift available area represented by the sixth display object OB6.

Then, an operation of the display system 1000 when the adjustment of the projection image G has been performed in the second UI 2211 will be described.

Figure 9:
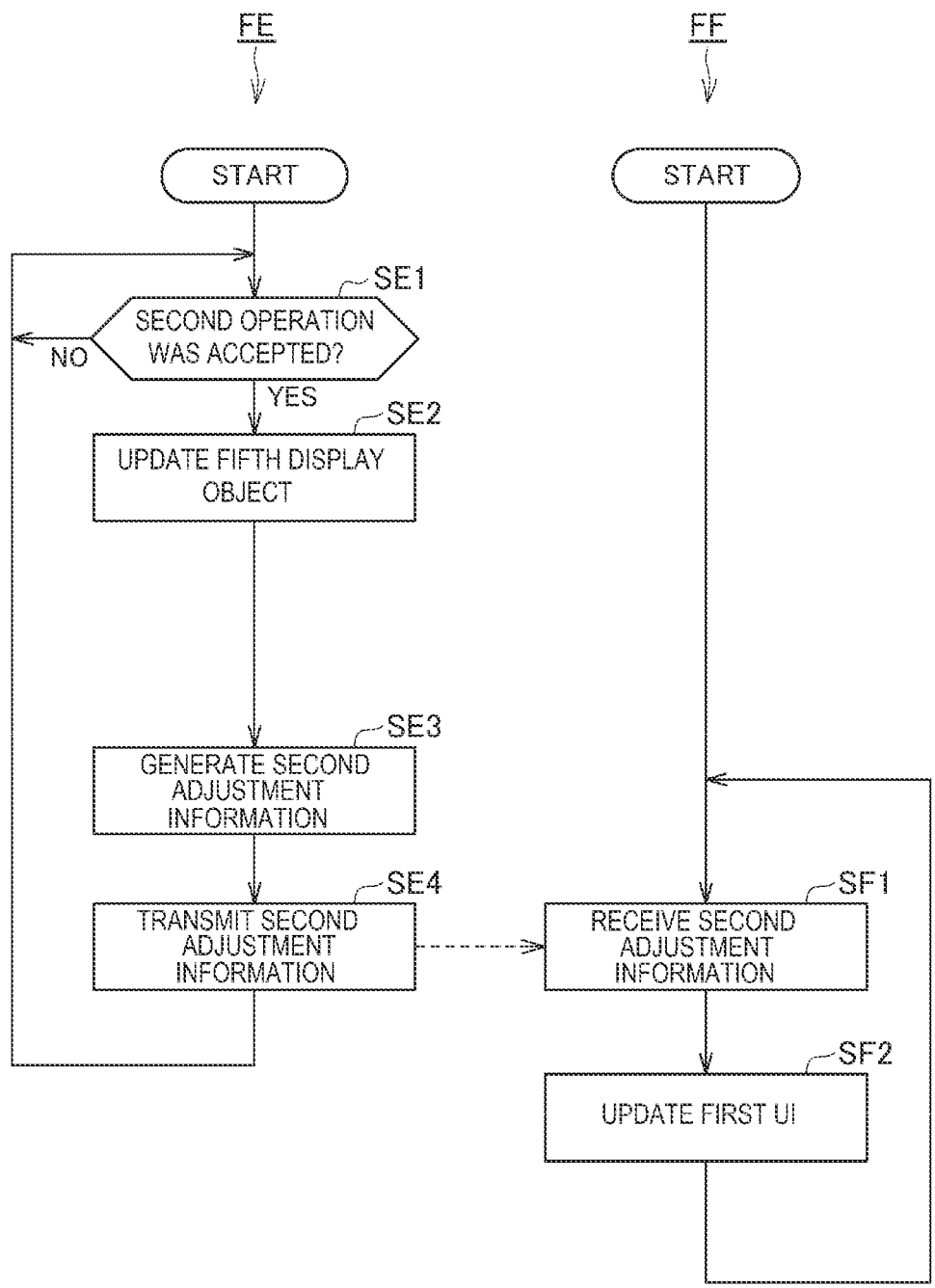
FIG. 9 is a flowchart showing the operation of the display system.

FIG. 9 is a flowchart showing the operation of the display system 1000. In FIG. 9, a flowchart FE represents the operation of the control device 2, and a flowchart FF represents the operation of the projector 1. In the operations shown in FIG. 9, the projector 1 currently displays the first UI 1121, and the control device 2 currently displays the second UI 2211.

As shown in the flowchart FE, the app executer 211 determines (step SE1) whether or not the second operation has been received. The second operation is an operation to the second UI 2211, and is an operation of adjusting the projection image G. In the operations shown in FIG. 9, the second operation is an operation to the second UI 2211 for the lens shift adjustment.

When the app executer 211 has determined that the second operation has not been accepted (NO in the step SE1), the app executer 211 performs the determination in the step SE1 once again.

When the app executer 211 has determined that the second operation has been accepted (YES in the step SE1), the app executer 211 updates (step SE2) the fifth display object OB5 of the second UI 2211.

The step SE2 will be described invoking FIG. 8.

When the second operation is an operation of moving the projection image G rightward as much as a second distance, the app executer 211 updates the fifth display object OB5 as shown in FIG. 8. That is, the app executer 211 updates the fifth display object OB5 currently displayed with the fifth display object OB5 obtained by moving the seventh display object OB7 rightward as much as a distance corresponding to the second distance in the lens shift available area represented by the sixth display object OB6.

Then, the app executer 211 generates (step SE3) the second adjustment information. For example, when the second operation having been accepted is the operation of moving the projection image G rightward as much as the second distance, the app executer 211 generates the second adjustment information representing that the moving direction of the projection image G is the rightward direction, and that the displacement of the projection image G is the second distance.

Then, the app executer 211 transmits (step SE4) the second adjustment information generated in the step SE3 to the projector 1.

As shown in the flowchart FF, the receiver 115 receives (step SF1) the second adjustment information from the control device 2.

Then, the UI processor 112 updates (step SF2) the first UI 1121 based on the second adjustment information received in the step SF1.

The step SF2 will be described invoking FIG. 7.

When the second adjustment information having been received represents that the projection image G is moved rightward as much as the second distance, the UI processor 112 updates the first UI 1121 in the step SF2 as shown in FIG. 7. That is, the UI processor 112 performs the update with the second display object OB2 obtained by moving the fourth display object OB4 rightward as much as a distance corresponding to the second distance in the lens shift available area represented by the third display object OB3. The UI processor 112 updates the first display object OB1 with the first display object OB1 obtained by magnifying the fourth display object OB4, which has been moved rightward as much as a distance corresponding to the second distance, up to the projection area.

In the description with reference to FIG. 5, FIG. 6, FIG. 7, FIG. 8, and FIG. 9, there is illustrated when the adjustment of the projection image G is the lens shift adjustment. However, the adjustment of the projection image G is not limited to the lens shift adjustment, and can also be a zoom adjustment, an adjustment of a geometric correction, or the like. In the adjustment other than the lens shift adjustment, there are displayed the first UI 1121 and the second UI 2211 corresponding to the adjustment other than the lens shift adjustment.

FIG. 10 is a diagram showing an example of the first UI 1121 related to the zoom adjustment. As is obvious from a comparison between FIG. 3 and FIG. 10, in the first UI 1121 related to the zoom adjustment, the second display object OB2 further includes an eighth display object OB8. The eighth display object OB8 is an image representing the size of the projection image G when the zoom magnification is the lowest. The center of the eighth display object OB8 coincides with the center of the fourth display object OB4. Therefore, when, for example, the fourth display object OB4 has moved due to the lens shift adjustment, the eighth display object OB8 moves so that the center thereof coincides with the center of the fourth display object OB4.

Figure 11:
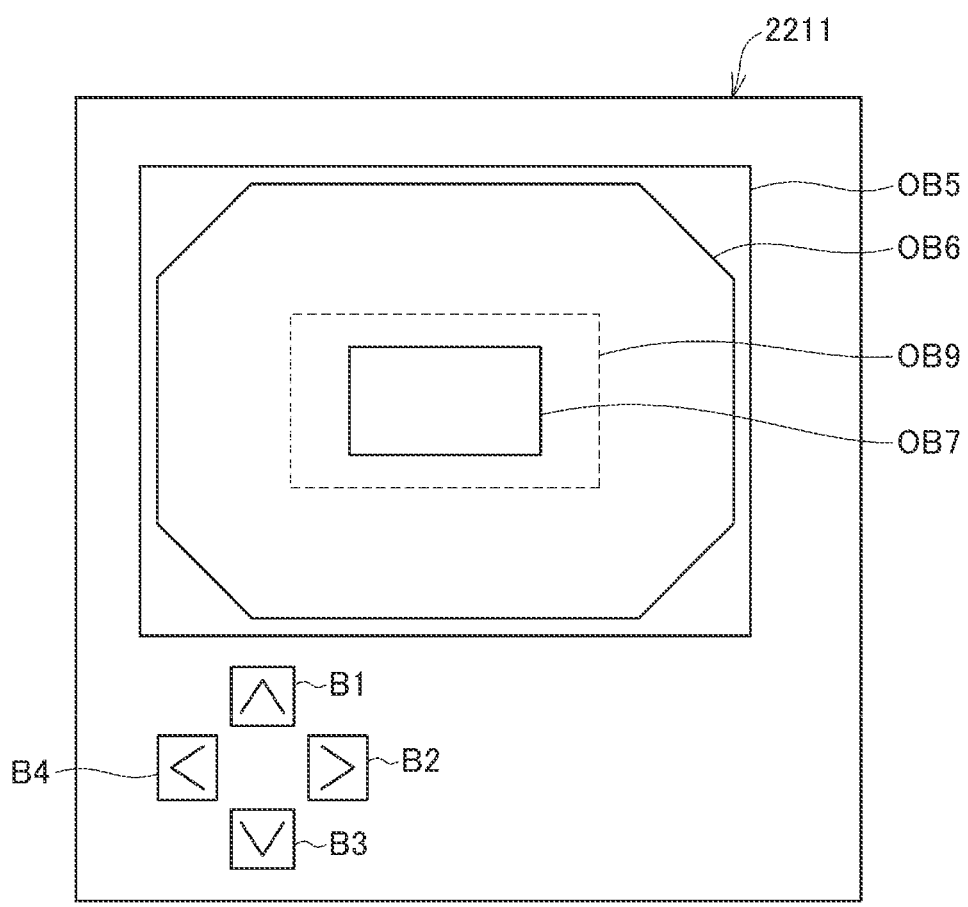
FIG. 11 is a diagram showing an example of the second UI.

FIG. 11 is a diagram showing an example of the second UI 2211 related to the zoom adjustment.

As is obvious from a comparison between FIG. 4 and FIG. 11, in the second UI 2211 related to the zoom adjustment, the fifth display object OB5 further includes a ninth display object OB9. The ninth display object OB9 is an image representing the size of the projection image G when the zoom magnification is the lowest. The center of the ninth display object OB9 coincides with the center of the seventh display object OB7. Therefore, when, for example, the seventh display object OB7 has moved due to the lens shift adjustment, the ninth display object OB9 moves so that the center thereof coincides with the center of the seventh display object OB7.

As described hereinabove, the method of controlling the display system 1000 includes displaying, by the projector 1, the first UI 1121 related to the adjustment of the projection image G, displaying, by the control device 2 communicating with the projector 1, the second UI 2211 as the UI which is related to the adjustment of the projection image G, and which includes the fifth display object OB5 corresponding to the projection image G, transmitting, by the projector 1, the first adjustment information based on the first operation to the control device 2 when the projector 1 accepts the first operation to the first UI 1121, adjusting, by the projector 1, the projection image G based on the first adjustment information, updating, by the control device 2, the fifth display object OB5 based on the first adjustment information, transmitting, by the control device 2, the second adjustment information based on the second operation to the projector 1 when the control device 2 accepts the second operation to the second UI 2211, adjusting, by the projector 1, the projection image G based on the second adjustment information, and updating, by the projector 1, the first UI 1121 based on the second adjustment information.

According to the above, the projector 1 and the control device 2 display the UI related to the adjustment of the projection image G, the fifth display object OB5 is updated in tandem with the first operation, and the projection image G is adjusted and at the same time the first UI 1121 is updated in tandem with the second operation. Therefore, it becomes possible to perform the adjustment of the projection image G just by looking at either one of the projection image G of the projector 1 and the display screen of the control device 2. Therefore, it is possible to reduce the number of times the projection image G of the projector 1 and the display screen of the control device 2 are compared by eyes with each other in the adjustment of the projection image G, and thus, it is possible to reduce the burden on the user in the adjustment of the projection image G. Further, since it is possible to reduce the burden on the user in the adjustment of the projection image G, it is possible to increase the adjustment operation efficiency of the projection image G, and thus, it is possible to achieve reduction in time for adjusting the projection image G.

The projector 1 displays the first UI 1121 when the control device 2 accepts the adjustment start instruction of the projection image G, and the control device 2 displays the second UI 2211 when the control device 2 accepts the adjustment start instruction of the projection image G.

According to the above, the projector 1 functions as starting point to start the adjustment of the projection image G.

The control device 2 displays the second UI 2211 when the projector 1 accepts the adjustment start instruction of the projection image G, and the projector 1 displays the first UI 1121 when the projector 1 accepts the adjustment start instruction of the projection image G.

According to the above, the control device 2 functions as a starting point to start the adjustment of the projection image G.

The method of controlling the display system 1000 includes updating, by the projector 1, the first UI 1121 based on the first operation when the projector 1 accepts the first operation, and updating, by the control device 2, the fifth display object OB5 based on the second operation when the control device 2 accepts the second operation.

According to the above, the first UI 1121 is updated in tandem with the first operation, and the fifth display object OB5 of the second UI 2211 is updated in tandem with the second operation. Therefore, it is possible to reduce the number of times the projection image G of the projector 1 and the display screen of the control device 2 are compared by eyes with each other in the adjustment of the projection image G, and thus, it is possible to reduce the burden on the user in the adjustment of the projection image G.

The adjustment of the projection image G is the lens shift adjustment, the first UI 1121 represents the positional relationship between the projection image G and the lens shift available area in which it is possible to move the projection image G with the lens shift adjustment, and the fifth display object OB5 represents a positional relationship between the lens shift available area and the projection image G.

According to the above, it is possible to reduce the burden on the user in the lens shift adjustment.

The display system 1000 includes the projector 1 and the control device 2 communicating with the projector 1. The projector 1 displays the first UI 1121 related to the adjustment of the projection image G. The control device 2 displays the second UI 2211 as the UI which is related to the adjustment of the projection image 1, and which includes the fifth display object OB5 corresponding to the projection image G. The projector 1 transmits the first adjustment information based on the first operation to the control device 2 when the projector 1 accepts the first operation to the first UI 1121. The projector 1 adjusts the projection image G based on the first adjustment information. The control device 2 updates the fifth display object OB5 based on the first adjustment information. The control device 2 transmits the second adjustment information based on the second operation to the projector 1 when the control device 2 accepts the second operation to the second UI 2211. The projector 1 adjusts the projection image G based on the second adjustment information. The projector 1 updates the first UI 1121 based on the second adjustment information.

According to the above, substantially the same advantages as the advantages of the method of controlling the display system 1000 described above are exerted.

The embodiment described above is a preferred aspect of an implementation of the present disclosure. It should be noted that the present embodiment is not a limitation, and the present disclosure can be implemented in a variety of modified aspects within the scope or the spirit of the present disclosure.

In the embodiment described above, there is illustrated when the plurality of projectors 1 performs tiling display, but the display aspect performed by the plurality of projectors 1 is not limited to the tiling display, and it is possible to perform, for example, stacking display of stacking a plurality of projection images G to display the projection images G high in luminance.

It is possible to realize the functions of the first processor 110 and the second processor 210 with a plurality of processors, or a semiconductor chip.

The functional units shown in FIG. 2 are for showing a functional configuration, and do not limit a specific implementation configuration. For example, in the projector 1 and the control device 2, it is not necessarily required to install the hardware corresponding individually to each of the functional units, but it is obviously possible to adopt a configuration of realizing the functions of the plurality of functional units by a single processor executing a program. A part of the function realized by the software in the embodiment described above can also be realized by hardware, or a part of the function realized by the hardware can also be realized by software. Besides the above, the specific detailed configuration of each of other constituents of the projector 1 and the control device 2 can arbitrarily be modified within the scope or the spirit of the present disclosure.

For example, the unit steps of the operations shown in FIG. 5, FIG. 6, and FIG. 9 are obtained by dividing the operations in accordance with principal processing contents in order to make easy to understand the operation of the display system 1000, and the present disclosure is not limited by the way of the division or the name of the processing unit. It is possible to divide the operations into a larger number of unit steps in accordance with the processing contents. It is also possible to divide the operations so that each of the unit steps includes a larger amount of processing. The order of the steps can arbitrarily be exchanged within a range in which no problem is posed in the scope or the spirit of the present disclosure.

What is claimed is:

1. A display control method comprising:
   displaying, by at least one projector, a first user interface related to an adjustment of a projection image including a first display object corresponding to the projection image;
   displaying, by at least one controller communicating with the at least one projector, a second user interface including a second user interface display object corresponding to the projection image;
   transmitting, by the at least one projector, first adjustment information based on a first operation to the first user interface to the at least one controller when the at least one projector accepts the first operation;
   adjusting, by the at least one projector, the projection image based on the first adjustment information;
   updating, by the at least one controller, the first display object based on the first adjustment information;
   transmitting, by the at least one controller, second adjustment information based on a second operation to the second user interface to the at least one projector when the at least one controller accepts the second operation;
   adjusting, by the at least one projector, the projection image based on the second adjustment information; and
   updating, by the at least one projector, the first user interface based on the second adjustment information, wherein
   the adjustment of the projection image is a lens shift adjustment,
   the first user interface represents a positional relationship between the projection image and an area in which it is possible to move the projection image with the lens shift adjustment, and
   the first user interface includes a second display object representing a positional relationship between the area and the projection image, with the second display object superimposed on the first display object.

2. The display control method according to claim 1, wherein
   the displaying the first user interface includes displaying, by the at least one projector, the first user interface when the at least one controller accepts an instruction of starting the adjustment of the projection image; and
   the displaying the second user interface includes displaying, by the at least one controller, the second user interface when the at least one controller accepts the instruction.

3. The display control method according to claim 1, wherein
   the displaying the second user interface includes displaying, by the at least one controller, the second user interface when the at least one projector accepts an instruction of starting the adjustment of the projection image; and
   the displaying the first user interface includes displaying, by the at least one projector, the first user interface when the at least one projector accepts the instruction.

4. The display control method according to claim 1, further comprising:
   updating, by the at least one projector, the first user interface based on the first operation; and
   updating, by the at least one controller, the second display object based on the second operation.

5. A display system comprising:
   at least one projector comprising at least one first processor; and
   at least one controller comprising at least one second processor which communicates with the first processor, wherein
   the first processor is programmed to execute
      displaying a first user interface related to an adjustment of a projection image including a first display object corresponding to the projection image,
      transmitting first adjustment information based on a first operation to the first user interface to the second processor when the first processor accepts the first operation,
      adjusting the projection image based on the first adjustment information,
      adjusting the projection image based on second adjustment information, and
      updating the first user interface based on the second adjustment information, and
   the second processor is programmed to execute
      displaying a second user interface including a second user interface display object corresponding to the projection image,
      updating the display object based on the first adjustment information, and
      transmitting the second adjustment information based on a second operation to the second user interface to the first processor when the second processor accepts the second operation, wherein the adjustment of the projection image is a lens shift adjustment, the first user interface represents a positional relationship between the projection image and an area in which it is possible to move the projection image with the lens shift adjustment, and the first user interface includes a second display object representing a positional relationship between the area and the projection image, with the second display object superimposed on the first display object.

6. The display system according to claim 5, wherein the displaying the first user interface includes displaying, by the at least one projector, the first user interface when the at least one controller accepts an instruction of starting the adjustment of the projection image; and the displaying the second user interface includes displaying, by the at least one controller, the second user interface when the at least one controller accepts the instruction.

7. The display system according to claim 5, wherein the displaying the second user interface includes displaying, by the at least one controller, the second user interface when the at least one projector accepts an instruction of starting the adjustment of the projection image; and the displaying the first user interface includes displaying, by the at least one projector, the first user interface when the at least one projector accepts the instruction.

8. The display system according to claim 5, wherein:

the first processor is programmed to execute updating the first user interface based on the first operation; and the second processor is programmed to execute updating the second display object based on the second operation.

* * * * *